(12) United States Patent
Rotem et al.

(10) Patent No.: US 7,461,272 B2
(45) Date of Patent: Dec. 2, 2008

(54) DEVICE, SYSTEM AND METHOD OF THERMAL CONTROL

(75) Inventors: Efraim Rotem, Haifa (IL); Lev Finkelstein, Netanya (IL)

(73) Assignee: Intel Corporation, Santa Clara, CA (US)

( * ) Notice: Subject to any disclaimer, the term of this patent is extended or adjusted under 35 U.S.C. 154(b) by 631 days.

(21) Appl. No.: 11/016,917

(22) Filed: Dec. 21, 2004

(65) Prior Publication Data

US 2006/0136076 A1 Jun. 22, 2006

(51) Int. Cl.
*G06F 1/00* (2006.01)
*G05D 23/00* (2006.01)

(52) U.S. Cl. ...................... 713/300; 700/299

(58) Field of Classification Search ............... 62/259.2; 700/44, 46, 299; 713/320, 300, 722, 500, 713/501; 702/75; 727/513
See application file for complete search history.

(56) References Cited

U.S. PATENT DOCUMENTS 6,058,012 A * 5/2000 Cooper et al. ............... 361/704
6,928,559 B1 * 8/2005 Beard .......................... 713/300

OTHER PUBLICATIONS

Gochman et al. "The Intel (RTM) Pentium (RTM) M Processor: Microarchitecture and Performance" Intel Technology Journal, vol. 07, Issue 02 Published on May, 21, 2003 ISSN 1535-864X Available online at: www.Intel.com/technology/itj/2003/volume07issue02/art03_pentiumm/p10_speedstep.htm.

K. Skadron, T. Abdelzaher, M. R. Stan "Control-Theoretic Techniques and Thermal RC modeling for Accurate and Localized Dynamic Thermal Management" Published in the Proceedings of the Eighth International Symposium on High-Performance Computer Architecture (HPCA) Feb. 2002.

"Advanced Configuration and Power Interface (ACPI) Specification" Hewlett-Packard Corporation, Intel Corporation, Microsoft Corporation, Phoenix Technologies Ltd., Toshiba Corporation Revision 3.0, Sep. 2, 2004 Table of Contents, and Chapter 11, pp. 325-352 Available online at: www.ACPI.info/spec/htm.

Skadron et al. "Temperature-Aware Microarchitecture" In the Proceedings of the 30th International Symposium on Computer Architecture Jun. 2003 pp. 1-12.

"ACPI Overview" Available online at: www.ACPI.info/over.htm.
"Intel SpeedStep Technology Backgrounder" pp. 1-3.
Intel Low Power Technologies for Mobile PCs pp. 1-7.
"Intel Processor Packages for Mobile PCs" p. 1.
"Intel Mobile Cooling Technology Provides Higher Performance in Thinner and Cooler Notebooks" pp. 1-6.
"Standard Performance Evaluation Corporation (SPEC) CPU2000 version 1.2" Documentation Published by SPEC on Oct. 30, 2001 Available online at: www.SPEC.org/cpu2000/docs.
"Device Driver Power and Performance Management—White Paper" Intel Corporation Aug. 21, 2001 pp. 1-23.

* cited by examiner

*Primary Examiner*—Chen-Wen Jiang
(74) *Attorney, Agent, or Firm*—Kacvinsky LLC

(57) ABSTRACT

Briefly, some embodiments of the invention may provide devices, systems and methods for thermal control. For example, a method in accordance with an embodiment of the invention may include modifying an operational parameter of a processor based on a temperature of a heat sink associated with the processor.

19 Claims, 2 Drawing Sheets

DEVICE, SYSTEM AND METHOD OF THERMAL CONTROL

BACKGROUND OF THE INVENTION

In order to dissipate heat of a computing platform, a heat sink may be attached to one or more processors of the computing platform. If the temperature of the heat sink is relatively high, then a sudden increase of frequency or power level of a processor may, for example, cause the processor to overheat beyond its maximum allowed temperature. This may result in, for example, decreased performance or malfunction of the processor or the computing platform.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

Figure 1:
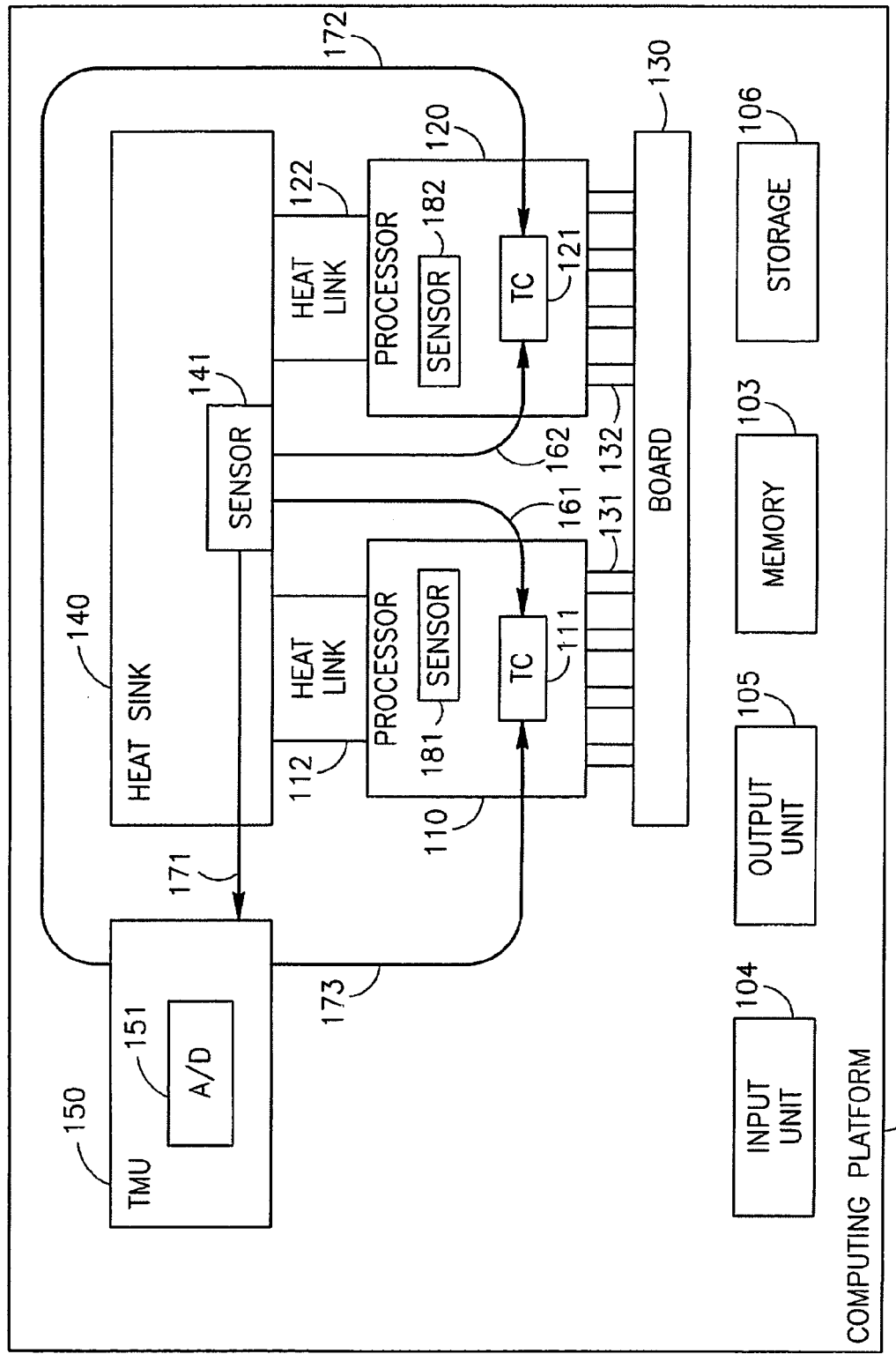
FIG. 1 is a schematic block diagram illustration of a computing platform incorporating a thermal control scheme in accordance with an exemplary embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

It should be understood that embodiments of the invention may be used in a variety of applications. Although the invention is not limited in this respect, embodiments of the invention may be used in conjunction with many apparatuses, for example, a personal computer, a desktop computer, a mobile computer, a laptop computer, a notebook computer, a tablet computer, a server computer, a network, a Personal Digital Assistant (PDA) device, a wireless communication station, a wireless communication device, a cellular telephone, a mobile telephone, a wireless telephone, a Personal Communication Systems (PCS) device, a PDA device which incorporates a wireless communication device, or the like. Embodiments of the invention may be used in various other apparatuses, devices, systems and/or networks.

FIG. 1 schematically illustrates a block diagram of a computing platform 100 incorporating a thermal control scheme in accordance with exemplary embodiments of the invention. Computing platform 100 may include, for example, an input unit 104, an output unit 105, a memory unit 103, a storage unit 106, and one or more processors, for example, processors 110 and 120. Computing platform 100 may further include other suitable hardware components and/or software components.

Input unit 104 may include, for example, a keyboard, a mouse, a touch-pad, or other suitable pointing device or input device. Output unit 105 may include, for example, a Cathode Ray Tube (CRT) monitor, a Liquid Crystal Display (LCD) monitor, or other suitable monitor or display unit, Memory unit 103 may include, for example, a Random Access Memory (RAM), a Read Only Memory (ROM), a Dynamic RAM (DRAM), a Synchronous DRAM (SD-RAM), a Flash memory, a volatile memory, a non-volatile memory, a cache memory, a buffer, a short term memory unit, a long term memory unit, or other suitable memory units or storage units.

Storage unit 106 may include, for example, a hard disk drive, a floppy disk drive, a Compact Disk (CD) drive, a CD-ROM drive, or other suitable removable or non-removable storage units.

Processor 110 and/or processor 120 may include, for example, a Central Processing Unit (CPU), a Digital Signal Processor (DSP), a microprocessor, a controller, a chip, a microchip, or any other suitable multi-purpose or specific processor or controller. In one embodiment, for example, processor 110 may include a CPU and processor 120 may include a graphics processor or an application-specific processor, or vice versa. In another embodiment, for example, processor 110 may be substantially identical, similar, or symmetrical to processor 120. In yet another embodiment, processor 110 and processor 120 may be able to operate at various, different frequencies.

Although computing platform 100 shows, for exemplary purposes, two processors 110 and 120, embodiments of the invention are not limited in this regard, and computing platform 100 may include only one processor, or more than two processors.

Processors 110 and 120 may be connected to a board 130, which may include, for example, a motherboard, a card, or other suitable circuitry to interconnect components of computing platform 100. In one embodiment, for example, memory unit 103 or other components of computing platform 100 may be connected to board 130. In some embodiments, processor 110 may be connected to board 130 through one or more connectors 131, and processor 120 may be connected to board 130 through one or more connectors 132. Connectors 131 and/or 132 may include, for example, one or more pins, balls, sockets, ports, links, wires, cables, or other suitable connections.

Processor 110 may include a Thermal Controller (TC) 111, for example, a controller able to modify the frequency, the power, the voltage, the current, the state, or one or more operational parameters of processor 110, e.g., based on the temperature of processor 110 or other data, as described in detail below. Similarly, processor 120 may include a TC 121, for example, a controller able to modify the frequency, the power, the voltage, the state, or one or more operational parameters of processor 120, e.g., based on the temperature of processor 120 or other data, as described in detail below.

Processor 110 may optionally include, may be thermally associated with, or may be coupled to a sensor 181, for example, a temperature sensor or other thermal sensor, able to provide an indication, e.g., a signal, responsive to the temperature in its vicinity. In one embodiment, sensor 181 may sense the temperature at one or more pre-defined locations or areas. In some embodiments, sensor 181 may be formed as an integral part of processor 110, may be integrated or incorporated with processor 110, may be embedded within or on processor 110, may be a sub-unit of processor 110, or may be coupled or thermally connected to processor 110. Similarly, processor 120 may optionally include, may be thermally associated with, or may be coupled to a sensor 182, for example, a temperature sensor or other thermal sensor, able to provide an indication, e.g., a signal, responsive to the temperature in its vicinity In one embodiment, sensor 182 may sense the temperature at one or more pre-defined locations or areas. In some embodiments, sensor 182 may be formed as an integral part of processor 120, may be integrated or incorporated with processor 120, may be embedded within or on processor 120, may be a sub-unit of processor 120, or may be coupled or thermally connected to processor 120.

Processors 110 and 120 may be connected to a common heat sink 140, which may include, for example, a heat exchanger, a heat spreader, or a cooling unit. In one embodiment, heat sink 140 may include, for example, a passive heat sink having fins or protrusions to dissipate heat. In another embodiment, heat sink 140 may include, for example, an active heat sink having a cooling unit or connected to a cooling unit, e.g., a fan/heat sink combination unit.

Processor 110 may be connected to heat sink 140 through a heat link 112, and processor 120 may be connected to heat sink 140 through a heat link 122. Heat links 112 and 122 may include, for example, one or more heat pipes or heat transfer units able to transfer heat from processors 110 and 120, respectively, to heat sink 140, e.g., by conduction.

Heat sink 140 may be thermally associated with or may be coupled to a sensor 141, for example, a temperature sensor or other thermal sensor, able to provide an indication, e.g., a signal, responsive to the temperature in its vicinity. In one embodiment, sensor 141 may sense the temperature at one or more pre-defined locations or areas. In some embodiments, sensor 141 may be formed as an integral part of heat sink 140, may be integrated or incorporated with heat sink 140, may be embedded within or on heat sink 140, may be a sub-unit of heat sink 140, or may be coupled or thermally connected to heat sink 140. In some embodiments, sensor 141 may be located at a common place or junction to which processors 110 and 120 are connected, e.g., between heat links 112 and 122, between the connection of heat sink 140 to heat link 112 and the connection of heat sink 140 to heat link 122, or approximately or substantially halfway between the connection of heat sink 140 to heat link 112 and the connection of heat sink 140 to heat link 122. In one embodiment, for example, sensor 141 may be positioned at a pre-defined location such that the thermal resistance corresponding to the path between this location and processors 110 and 120 is relatively low or substantially the lowest. Temperature sensed by sensor 141 may be referred to, for example, as "common temperature" or "heat sink temperature".

The TC 111 of processor 110 may obtain temperature data from sensor 141 of heat sink 140. For example, TC 111 may obtain from sensor 141 a value indicating a representative temperature of heat sink 140, e.g., the temperature at the location of sensor 141.

Similarly, the TC 121 of processor 120 may obtain temperature data from sensor 141 of heat sink 140. For example, TC 121 may obtain from sensor 141 a value indicating the representative temperature of heat sink 140, e.g., the temperature at the location of sensor 141.

In one embodiment, a signal or indication responsive to temperature data may be transferred from sensor 141 to TC 111 through a link 161, and/or from sensor 141 to TC 121 through a link 162.

In another embodiment, a signal or indication responsive to temperature data may be transferred from sensor 141 to TC 111 and/or TC 121 through a Thermal Management Unit (TMU) 150. For example, TMU 150 may include a controller able to receive and convert or process the signal or indication received from sensor 141, e.g., to produce temperature data based on the received signal or indication. In some embodiments, for example, a signal or indication responsive to temperature data may be transferred from sensor 141 to TMU 150 through a link 171, and, optionally, the signal or indication may be converted from an analog format to a digital format using an Analog to Digital (A/D) converter 151 which may optionally be included in TMU 150. TMU 150 may be connected through a link 173 to processor 110, e.g., to TC 111. TMU 150 may be connected through a link 172 to processor 120, e.g., to TC 121.

In accordance with some embodiments of the invention, an operational parameter of processor 110 and/or processor 120 may be modified, set, increased or decreased, in relation to or based on temperature data received from sensor 141, e.g., a temperature of heat sink 140. The term "operational parameter" as used herein may include, for example, frequency, power, voltage, current, state (e.g., active state, non-active state, stand-by state, or the like), or other suitable properties related to the operation of processor 110 and/or processor 120.

In one embodiment, for example, TMU 150 may send, to processor 110 through link 173 and/or to processor 120 through link 172, a signal indicating the temperature data received from sensor 141. Based on the received signal, TC 111 may modify the power or the frequency of processor 110 or the voltage or current supplied to processor 110, and/or TC 121 may modify the power or the frequency of processor 120 or the voltage or current supplied to processor 120. For example, if the received signal indicates that the temperature of sensor 141 is higher than a pre-defined threshold, than TC 111 may reduce the frequency or the power of processor 110, and/or TC 121 may reduce the frequency or the power of processor 120. Some exemplary methods for modifying operational parameters of processors 110 and/or 120 in accordance with some embodiments of the invention are described in detail below.

In another embodiment, TMU 150 may send, to processor 110 through link 173 and/or to processor 120 through link 172, a signal indicating a request to modify an operational parameter of the processor. For example, if TMU 150 determines that the temperature of sensor 141 is higher than a pre-defined threshold, then TMU 150 may send to processor 110 and/or processor 120 a request to modify or reduce power, voltage or frequency of processor 110 and/or processor 120, respectively.

Figure 2:
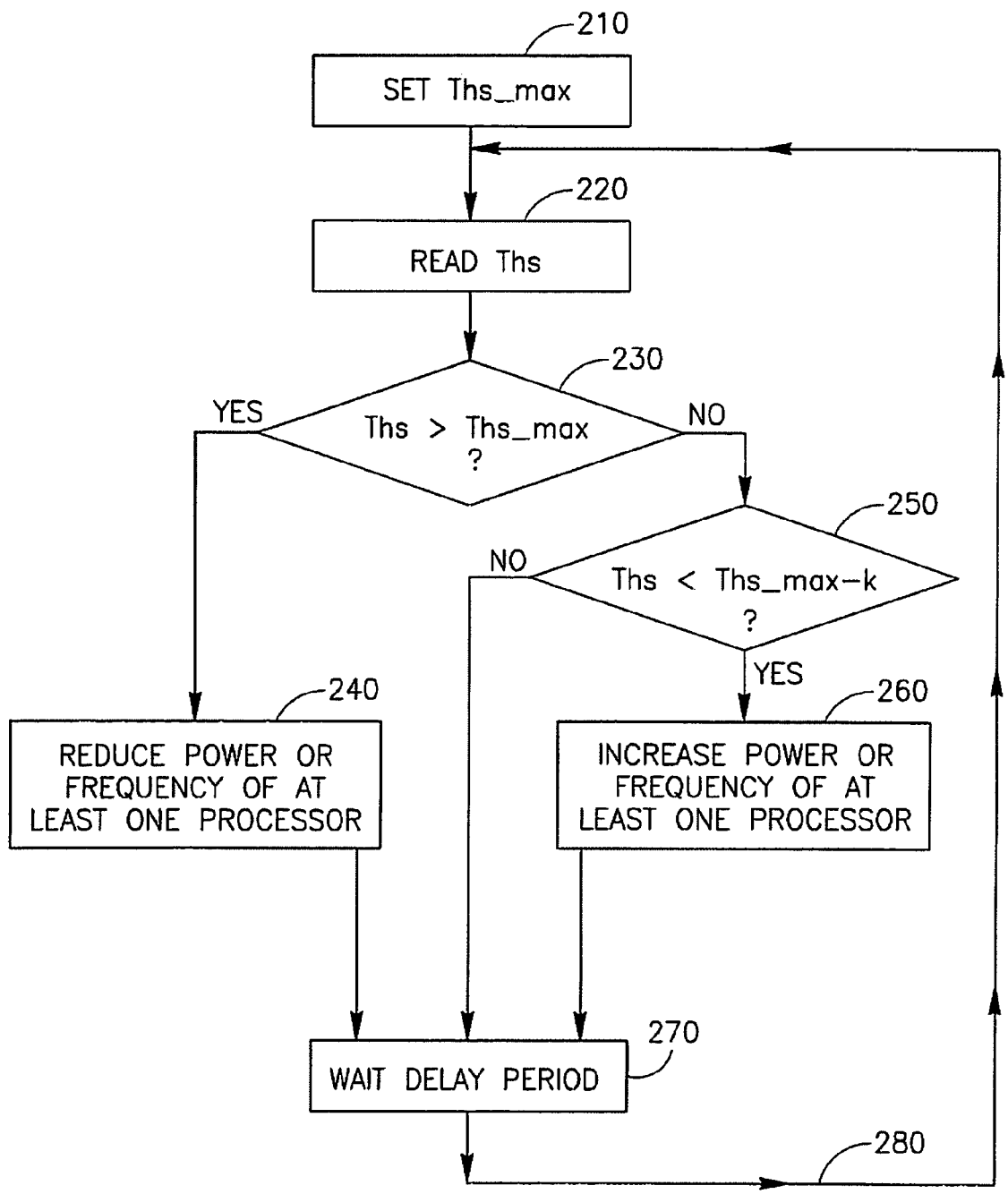
FIG. 2 is a schematic flow-chart of a method of thermal control in accordance with an exemplary embodiment of the invention.

FIG. 2 is a schematic flow-chart of a method of thermal control in accordance with exemplary embodiments of the invention. Operations of the method may be implemented, for example, by computing platform 100, by processor 110, by processor 120, by TC 111, by TC 121, by TMU 150, or by other suitable units, devices, and/or systems.

As indicated at box 210, the method may include, for example, reading a value of a parameter indicating a maximum allowed temperature for heat sink 140. For example, the parameter may be referred to as Ths_max, and its value may be set in accordance with the specifications of particular system resources, e.g., 50 degrees Celsius. In some embodiments, for example, the parameter value may be pre-set or pre-defined by a manufacturer of heat sink 140 or of processors 110 and/or 120. The parameter value may be read, for example, by TMU 150, by processor 110, by processor 120, by TC 111, or by TC 121.

As indicated at box 220, the method may include, for example, reading the temperature at a pre-defined location of heat sink 140. For example, the reading may be performed by sensor 141, and may include sensing, measuring, or otherwise determining the temperature. The read temperature may be referred to as Ths.

As indicated at box 230, the method may include determining whether the value of Ths is greater than the value of Ths_max. This may be performed, for example, by subtracting the value of Ths from Ths_max, or by otherwise comparing the value of Ths and Ths_max, and may be executed, for example, by TMU 150, by processor 110, by processor 120, by TC 111, or by TC 121.

If it is determined that the value of Ths is higher than the value of Ths_max, then, as indicated at box 240, the method may include reducing the frequency, the power or the voltage of at least one processor, or modifying the state or other operational parameter of one or more processors, for example, of processor 110 and/or processor 120.

The operations of box 240 may include, for example, reducing a frequency by a frequency step size, reducing a voltage by a voltage step size, or otherwise modifying a state or another operational parameter of processor 110 and/or processor 120. For example, processor 110 and/or processor 120 may be an Intel (RTM) processor having SpeedStep (RTM) architecture or technology (e.g., as described in "The Intel (RTM) Pentium (RTM) M Processor: Microarchitecture and Performance", Intel Technology Journal, Volume 07, Issue 02, Published on May 21, 2003, ISSN 1535-864X, available online at: <www.Intel.com/technology/itj/2003/volume07issue02/art03_pentiumm/p10_speedstep.htm>), allowing reduction or modification of an operational parameter (e.g., power, voltage, current, frequency, or state) by pre-defined, discrete, steps. In one embodiment, for example, frequency may be reduced from, e.g., 2,800 MHz to, e.g., 2,600 MHz, by one step size or by a number of step sizes, depending on the resolution of a particular step-wise scheme. In some embodiments, step sizes may be pre-defined, for example, by a manufacturer of processor 110 and/or processor 120, and a step size of processor 110 may be different from a step size of processor 120.

Referring again to box 230, if it is determined that the value of Ths is not greater than the value of Ths_max, then, as indicated at box 250, the method may include determining whether the value of Ths is smaller than the difference between Ths_max and k, wherein k may be a relatively small positive number. In one embodiment, for example, k may be equal to approximately one percent of the difference between Ths_max and Ths. In another embodiment, for example, k may be equal to approximately 0.1 degree Celsius. In other embodiments, k may be equal to other suitable constant or variable values.

If it is determined that the value of Ths is smaller than the difference between Ths_max and k, then, as indicated at box 260, the method may include increasing the frequency, the power or the voltage of at least one processor, or otherwise modifying an operational parameter of one or more processors, for example, of processor 110 and/or processor 120.

In one embodiment, the operations of box 260 may include, for example, modifying or increasing the power of a processor to a value equal to the lower of PC and (Pc+X), wherein PC may be substantially the maximum power of the processor, Pc may be the power state (e.g., a currently representative power value) of the processor, and X may be a step size of the processor. Referring again to box 250, if it is determined that the value of Ths is not smaller than the difference between Ths_max and k, then the method may proceed to perform the operations of box 270. Additionally, after the reducing operations of box 240, or after the increasing operations of box 260, the method may proceed to perform the operations of box 270.

As indicated at box 270, the method may optionally include waiting a pre-defined period of time, for example, approximately one millisecond, e.g., before proceeding to perform subsequent operations of the method.

As indicated by arrow 280, the method may repeat one or more operations, for example, the method may repeat the operations of box 220 and onward. In some embodiments, the repeating may be performed periodically or after a pre-defined time interval elapses. In some embodiments, the operations of box 220 and onward may be repeated or re-invoked when one or more pre-defined conditions or criteria are met.

Although two exemplary conditions are shown in box 230 and box 250, to trigger modification of an operational parameter of processors 110 and/or 120, embodiments of the invention are not limited in this regard and may use other triggering events, conditions, comparisons, analyses, or criteria. For example, some embodiments may use calculations or conditions based on a Proportional Integral Derivative (PID) thermal control algorithm (e.g., as described in K. Skadron, T. Abdelzaher, and M. R. Stan, "Control-Theoretic Techniques and Thermal RC modeling for Accurate and Localized Dynamic Thermal Management", published in the Proceedings of the Eighth International Symposium on High-Performance Computer Architecture (HPCA), February 2002), or a thermal control algorithm used by an Advanced Configuration and Power Interface (ACPI) (e.g., as described in ACPI Specification, Revision 3.0, Chapter 11, published on Sep. 2, 2004, available online at: <www.acpi.info/spec.htm>).

In some embodiments, suitable calculations may be used to determine whether to reduce, increase, set or modify power, voltage, current, frequency, state, or other operational parameters of processors 110 and/or 120. For example, a maximum allowed temperature of processor 110, denoted Tp_max, may be determined. This may be performed, for example, by reading a pre-defined value of a maximum allowed temperature parameter provided by a manufacturer of the processor. The temperature sensed by sensor 141, denoted 177s, may be subtracted from Tp_max, resulting in a temperature difference dT For example, in some embodiments, the following equation may be used:

$$dT = Tp\_max - Ths \qquad (1)$$

The temperature difference dT may be divided by a parameter, denoted θ (Theta), relating to the thermal resistance corresponding to the path between processor 110 and sensor 141, resulting in a maximum power of processor 110, denoted Pp_max. For example, in some embodiments, the following equation may be used, e.g., if processor 110 is in a steady state:

$$Pp\_max = dT/\theta \qquad (2)$$

In one embodiment, the value of θ may be determined based on pre-defined manufacturer values. In another embodiment, θ may be dynamically measured or computed, for example, using a workload benchmark test, e.g., using Standard Performance Evaluation Corporation (SPEC) CPU2000 benchmark test (for example, as described by "SPEC CPU2000 version 1.2" Documentation, published by SPEC on Oct. 30, 2001, available online at: <www.SPEC.org/cpu2000/docs>).

In some embodiments, the power of processor 110, denoted Pp, may be determined or remotely estimated based on a sensed temperature of processor 110, e.g., based on a sensing by sensor 181 of processor 110.

For example, in some embodiments, the temperature of the heat sink 140, e.g., the temperature sensed by sensor 141, denoted Ths, may be subtracted from the temperature of processor 110, e.g., the temperature sensed by sensor 181, denoted Tp. The resulting temperature difference may be divided by the thermal resistance parameter θ, resulting the power of processor 110, denoted Pp. For example, in some embodiments, the following equation may be used:

$$Pp = (Tp - Ths)/\theta \qquad (3)$$

In some embodiments, similar calculations may be used, for example, to determine the power of processor 120, e.g., by dividing the difference between the temperature of processor 120 and the temperature of heat sink 140 by the thermal resistance parameter θ.

In some embodiments, the power of processor 110, denoted Pp, may be matched with a frequency of processor 110, denoted Fp. For example, a Pp value of 20 Watts may correspond to a Fp value of 2,800 MHz. The matching may be performed, for example, using a conversion function or a pre-defined lookup table or list, e.g., taking into account a value of a power emitted by a specific implementation of components of computing platform 100.

The above exemplary calculations may allow, for example, sensor 141, heat sink 140, TMU 150, or other components of computing platform 100, to perform operations based on the temperature or the power of processor 110.

In alternate embodiments, a signal indicating the temperature of processor 110 may be transferred from sensor 181 of processor 110 to sensor 141, heat sink 140, TMU 150, or any other components of computing platform 100, in accordance with specific temperature management schemes. Similarly, a signal indicating the temperature of processor 120 may be transferred from sensor 182 of processor 120 to sensor 141, heat sink 140, TMU 150, or other components of computing platform 100.

In one embodiment, for example, the temperature of processor 110 may be used by TMU 150 to request that the frequency or power of processor 110 be modified, e.g., reduced. For example, TMU 150 may determine that the temperature of processor 110 is higher than a pre-defined threshold value, and may send a request to processor 110 to reduce its frequency, power, voltage, current, or perform other modifications to an operational parameter of processor 110.

In another embodiment, processor 120 may request, based on the temperature of processor 110, that the frequency or power of processor 110 be modified, e.g., reduced, or that an operational parameter of processor 110 be otherwise modified. For example, processor 120 may determine that the temperature of processor 110 is higher than a pre-defined threshold value, and may send a request to processor 110 to reduce its frequency or power.

In yet another embodiment, TMU 150 may request, based on the temperature of processor 110, that the frequency or power of processor 120 be modified, e.g., reduced, or that an operational parameter of processor 120 be otherwise modified. For example, TMU 150 may determine that the temperature of processor 110 is higher than a pre-defined threshold value, but that priority criteria or other workload considerations may not allow processor 110 to reduce its frequency or power. In such a case, TMU 150 may send a request to processor 120 to reduce its frequency or power, or to otherwise modify an operational parameter of processor 120.

In still another embodiment, the temperature of processor 110 may be used by processor 120 to modify, e.g., to reduce, the frequency or power of processor 120. For example, processor 120 may determine that the temperature of processor 110 is higher than a pre-defined threshold value, but that priority criteria or other workload considerations may not allow processor 110 to reduce its frequency or power. Therefore, processor 120 may reduce or modify its frequency, power, operational parameters, or state.

Other suitable operations or sets of operations may be used in accordance with embodiments of the invention.

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, stacks, storage units and/or memory units, for temporary or long-term storage of data or in order to facilitate the operation of a specific embodiment.

Some embodiments of the invention may be implemented, for example, using a machine-readable medium or article which may store an instruction or a set of instructions that, if executed by a machine, for example, by computing platform 100, by processor 110, by processor 120, by TC 111, by TC 121, by TMU 150, or by other suitable units or machines, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit (e.g., memory unit 103), memory device, memory article, memory medium, storage device, storage article, storage medium and/or storage unit (e.g., storage unit 106), for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method comprising:
    determining an operational parameter of a processor based on a temperature of a heat sink associated with the processor;
    determining a power of said processor based on said temperature of the heat sink and based on a thermal resistance parameter; and
    modifying the operational parameter of the processor based on the temperature of the heat sink.

2. The method of claim 1, comprising sensing said temperature of said heat sink at one or more pre-defined locations.

3. The method of claim 1, wherein said modifying comprises:
if said temperature is higher than a pre-defined threshold value, reducing an operational parameter selected from a group including a frequency of said processor, said power of said processor, a current of said processor, and a voltage of said processor.

4. The method of claim 1, comprising sending a request to modify said operational parameter of said processor.

5. The method of claim 1, comprising sending a request to reduce the frequency of said processor based on the power of said processor.

6. The method of claim 1, comprising modifying an operational parameter of a processing unit based on the power of said processor.

7. An apparatus comprising:
a controller to determine an operational parameter of a processor based on a temperature of a heat sink associated with the processor and modify the operational parameter of the processor based on the temperature of the heat sink, wherein said controller is to determine a power of said processor based on said temperature of the heat sink and based on a thermal resistance parameter.

8. The apparatus of claim 7, wherein said controller is, if said temperature is higher than a pre-defined threshold value, to reduce an operational parameter selected from a group including a frequency of said processor, said power of said processor, a current of said processor, and a voltage of said processor.

9. The apparatus of claim 7, wherein said controller is to send a request to modify said operational parameter of said processor.

10. The apparatus of claim 7, wherein said controller is to send a request to reduce the frequency of said processor based on the power of said processor.

11. The apparatus of claim 7, wherein said controller is to modify an operational parameter of a processing unit based on the power of said processor.

12. The apparatus of claim 7, wherein said controller comprises a thermal management unit.

13. A computing platform comprising:
a processor;
a heat sink associated with said processor; and
a controller to determine an operational parameter of the processor based on a temperature of the heat sink and modify said operational parameter of said processor based on the temperature of said heat sink, wherein said controller is to determine a power of said processor based on said temperature of the heat sink and based on a thermal resistance parameter.

14. The computing platform of claim 13, comprising a thermal sensor associated with a pre-defined location of said heat sink to sense said temperature.

15. The computing platform of claim 14, wherein said thermal sensor is integrally formed with said heat sink.

16. The computing platform of claim 14, wherein said controller is able to read said sensed temperature from said thermal sensor.

17. A machine-readable medium having stored thereon a set of instructions that, if executed by a machine, cause the machine to perform a method comprising:
determining an operational parameter of a processor based on a temperature of a heat sink associated with the processor;
determining a power of said processor based on said temperature of the heat sink and based on a thermal resistance parameter; and
modifying the operational parameter of the processor based on the temperature of the heat sink.

18. The machine-readable medium of claim 17, wherein the instructions result in:
sensing said temperature of said heat sink at one or more pre-defined locations.

19. The machine-readable medium of claim 17, wherein the instructions result in:
if said temperature is higher than a pre-defined threshold value, reducing an operational parameter selected from a group including a frequency of said processor, a power of said processor, a current of said processor, and a voltage of said processor.

* * * * *